(12) United States Patent  (10) Patent No.: US 8,517,301 B1
Jefferson et al.  (45) Date of Patent: Aug. 27, 2013

(54) AIRCRAFT GROUND MAINTENANCE TETHER ASSEMBLY

(75) Inventors: Ernest T Jefferson, Bath, NC (US); James H. Van Dis, Bath, NC (US)

(73) Assignee: Serias Design LLC, The Villages, FL (US)

( * ) Notice: Subject to any disclaimer, the term of this patent is extended or adjusted under 35 U.S.C. 154(b) by 71 days.

(21) Appl. No.: 13/153,553

(22) Filed: Jun. 6, 2011

Related U.S. Application Data

(63) Continuation-in-part of application No. 12/819,326, filed on Jun. 21, 2010, now Pat. No. 8,256,703.

(51) Int. Cl.
*B64D 47/00* (2006.01)

(52) U.S. Cl.
USPC .................. 244/1 R; 73/861.65; 150/154

(58) Field of Classification Search
USPC ......... 244/1 R; 73/861.65–861.68; 150/154, 150/156, 160
See application file for complete search history.

(56) References Cited

U.S. PATENT DOCUMENTS

| 2,532,316 | A | * | 12/1950 | Larkin | 150/154 |
|---|---|---|---|---|---|
| 5,026,001 | A | * | 6/1991 | Wright et al. | 244/1 R |
| 5,127,265 | A | * | 7/1992 | Williamson et al. | 73/182 |
| RE35,831 | E | * | 6/1998 | Wright et al. | 244/1 R |
| 6,412,343 | B1 | * | 7/2002 | Jefferson | 73/182 |
| 6,901,793 | B1 | * | 6/2005 | Jefferson | 73/182 |
| 7,175,344 | B2 | * | 2/2007 | D'Ouince et al. | 374/208 |
| 8,132,471 | B2 | * | 3/2012 | DeGroff et al. | 73/861.65 |
| 2003/0131916 | A1 | * | 7/2003 | Alexander | 150/154 |

* cited by examiner

*Primary Examiner* — Timothy D Collins
*Assistant Examiner* — Medhat Badawi
(74) *Attorney, Agent, or Firm* — Novak Druce Connolly Bove + Quigg LLP

(57) ABSTRACT

A highly visible tether assembly for use on parked aircraft that interconnects the pitot tube covers with the landing gear lock pin thereby assuring removal of both the covers and the lock pin as part of the aircraft preflight check list. The assembly is made of heat and environment resistant materials that avoid instrument and air craft damage during installation and residence.

7 Claims, 9 Drawing Sheets

AIRCRAFT GROUND MAINTENANCE TETHER ASSEMBLY

RELATED APPLICATION

This application is a continuation-in-part application of U.S. Ser. No. 12/819,326, filed on Jun. 21, 2010 now U.S. Pat. No. 8,256,703.

FIELD OF THE INVENTION

The present invention relates to the ground maintenance of aircraft and, in particular, to a tether assembly for assuring removal of ground protective devices prior to flight.

BACKGROUND OF THE INVENTION

During extended ground maintenance times, various protective devices are commonly installed to prevent damage to instrumentation and/or structural damage to the aircraft. Representative are pitot tube covers and landing gear locks pins.

Pitot tubes are used on aircraft for measuring speed and altitude. They are sensitive and delicate, and thus prone to damage during maintenance, and storage. To limit damage and contamination, the pitot tube covers are installed during any appreciable outdoor layover to prevent dust, particulates, water, and other foreign matter from entering the probe ports, all of which can contribute to erroneous outputs. Equally important to installation during layover is the need to remove the pitot tube covers prior to flight. Should they remain in place during flight, there are no effective procedures for removal and the instrument's assessment of speed and altitude are severely compromised. Accordingly and, as a matter of standard operating procedure, if not removed the plane must return to base for cover removal. Inasmuch as the plane may have departed with a full fuel load, landing under such high loading conditions can create substantial forces that can damage the airframe or otherwise affect structural integrity. It would therefor be desirable to provide an apparatus and procedure for assuring the removal of pitot covers prior to flight.

It is also desirable to provide the pitot covers and installation equipment in a package that can be carried on the associated plane, thus enabling aircraft, such as military, commercial or business planes, that are transient between facilities of varying ground maintenance capabilities, to have assured access to the covers regardless of landing location. It is also desirable to limit the number of separate items on any maintenance package. Thus installation equipment such as installation poles for higher mounted pitot tubes may be necessary and unavailable at remote locations but present an additional piece of equipment that must. It would thus be further desirable to integrate installation equipment in an assembly that could be readily stowed on and transported with the aircraft. On many aircraft, the covers may be manually installed without auxiliary equipment. On other aircraft, the probes are just out of reach and require installation tools. For larger aircraft with higher mounted probes, an installation tool such as disclosed in our pending application, U.S. Ser. No. 12/580,234 filed on Oct. 15, 2009, provides effective installation assistance. The tool, however, is considered too bulky for aircraft transport, and is generally conveniently available at facilities able to handle the larger aircraft.

The landing gear lock pins are installed to disable the landing gear retracting system to prevent inadvertent actuation during maintenance and/or ground operations that could collapse the nose wheel and structurally damage the aircraft. As with the pitot tube covers, the pins must be removed prior to flight, and if not removed, the plane must return to base with the resultant unnecessary expense and potential structural damage from a ful weight landing.

While there are established procedures for removing the covers and lock pins, human error nonetheless continues to produce non-compliant flights. Accordingly, it would be desirable to provide a maintenance product that would further reduce the chances of the covers and lock pins remaining on the aircraft at takeoff.

SUMMARY OF THE INVENTION

The present invention provides a highly visible tether assembly for use on parked aircraft that interconnects the pitot tube covers with the landing gear lock pin thereby assuring removal of both the covers and the lock pin as part of the aircraft preflight check list. The assembly is made of heat and environment resistant materials that avoid instrument and air craft damage during installation and residence. For lower mounted probes, the tether connects directly with the covers. For higher mounted probes, the tether attaches to pole mounted covers.

More particularly, the tethering assembly comprises a plurality of pitot tube covers for preferably all of the aircraft's pitot tubes, on both sides of the aircraft, which are interconnected by a lanyard of temperature resistant woven aramid material wherein the lanyard is provided with a middle biasing sleeve that elastically conforms to the fuselage contour in installation. The sleeve includes a connecting strap carrying a lock pin at an outer end that for disabling the landing gear retraction assembly to prevent inadvertent actuation on the ground.

In one aspect, the invention provides a ground maintenance assembly for an aircraft having at least a pitot tube on opposed sides of a fuselage above a front landing gear having a retracting linkage immobilized by insertion of a locking pin into a locking aperture thereon wherein the maintenance assembly includes a pitot tube cover for telescopic insertion over each pitot tube; an expandable tether assembly having opposed elongated straps, each having a distal end connected to one of said pitot to be covers, said tether assembly having a sleeve member with a passage therein, wherein one of said straps has a proximal end fixedly connected to said sleeve member and wherein the other strap has a proximal end connected to first end of an elastic member carried in said passage, said elastic member having a second end connected to said sleeve member whereby the length of the tether assembly is less that the distance about the fuselage between the pitot tubes and in assembly the elastic member is stretched to provide a biasing of the tether assembly against the fuselage; and a connecting strap having a first end attached to said tether assembly and a second end connected to said locking pin, said connecting strap having sufficient length in assembly to enable insertion of said locking pin in said locking aperture. In other aspects, the ground maintenance assembly may also use as the sleeve member is a planar rectangular sheet having opposed longitudinal edges releasably secured by fastening members to form a generally tubular shape with said passage extending therethrough. The ground maintenance assembly may have the straps and said sleeve member formed of a heat and environment resistant woven material, such as a meta-aramid polymer. The elastic member of the ground maintenance assembly may be an elastomer subject to ultraviolet degradation upon exposure to ambient sunlit conditions wherein the elastic said passage. The ground maintenance assembly may include banners carrying notifications for removal before aircraft flight are attached at plural locations on said covers and/or tether assembly.

In another aspect, the invention provides ground maintenance assembly for an aircraft having at least a pitot tube located on opposed sides of a fuselage at an elevation above manual access and a front landing gear having a retracting linkage immobilized by insertion of a locking pin into a locking aperture thereon, said maintenance assembly comprising: pair of pitot cover pole assemblies, each comprising a pitot tube cover for telescopic insertion over each pitot tube; an elastomeric body comprised of a matrix of fused milled rubber and heat resistant fiber, said body having a longitudinal bore; a tubular member of heat resistant woven material bonded to an inwardly facing surface of said bore with a silicone adhesive, said tubular member telescopically receiving said cover and being connected thereto; a spacer member having as shown in detail in U.S. Pat. No. 6,901,793 one end connected to said elastorneric body and a connecting member at another end; an expandable tether assembly having opposed elongated straps, each having a distal end connected to one of said connecting members of a pole assembly.

In a further aspect, the invention provides a pitot tube cover assembly for covering the pitot tube of an aircraft wherein said pitot tube is located at an elevation beyond manual access, comprising: a pitot tube cover formed of a heat resistant woven material and having an open ended cavity for telescopically receiving the pitot tube; a cylindrical elastomeric support collar consisting of a matrix of cured rubber and heat resistant fiber, said sleeve having an axial bore therethrough; a tubular sleeve of heat resistant woven material telescopically received in said bore and bonded to said support sleeve with a two part silicone rubber adhesive; an elongated shaft having first end connected to said support collar whereby said shaft may be manually directed for telescopically inserting said pitot cover over the pitot tube. The assembly may have a tubular arm radially extending from an outer surface of the support collar and having an outwardly opening recess for receiving said first end of said shaft, and may have a connecting member is connected with a second end of said shaft, said connecting member including a restraining device for holding the shaft in operative position on the aircraft.

BRIEF DESCRIPTION OF THE DRAWINGS

The above and other features and advantages of the present invention will become apparent upon reading the following description taken in conjunction with the accompanying drawings in which.

DESCRIPTION OF THE PREFERRED EMBODIMENT

Figure 1:
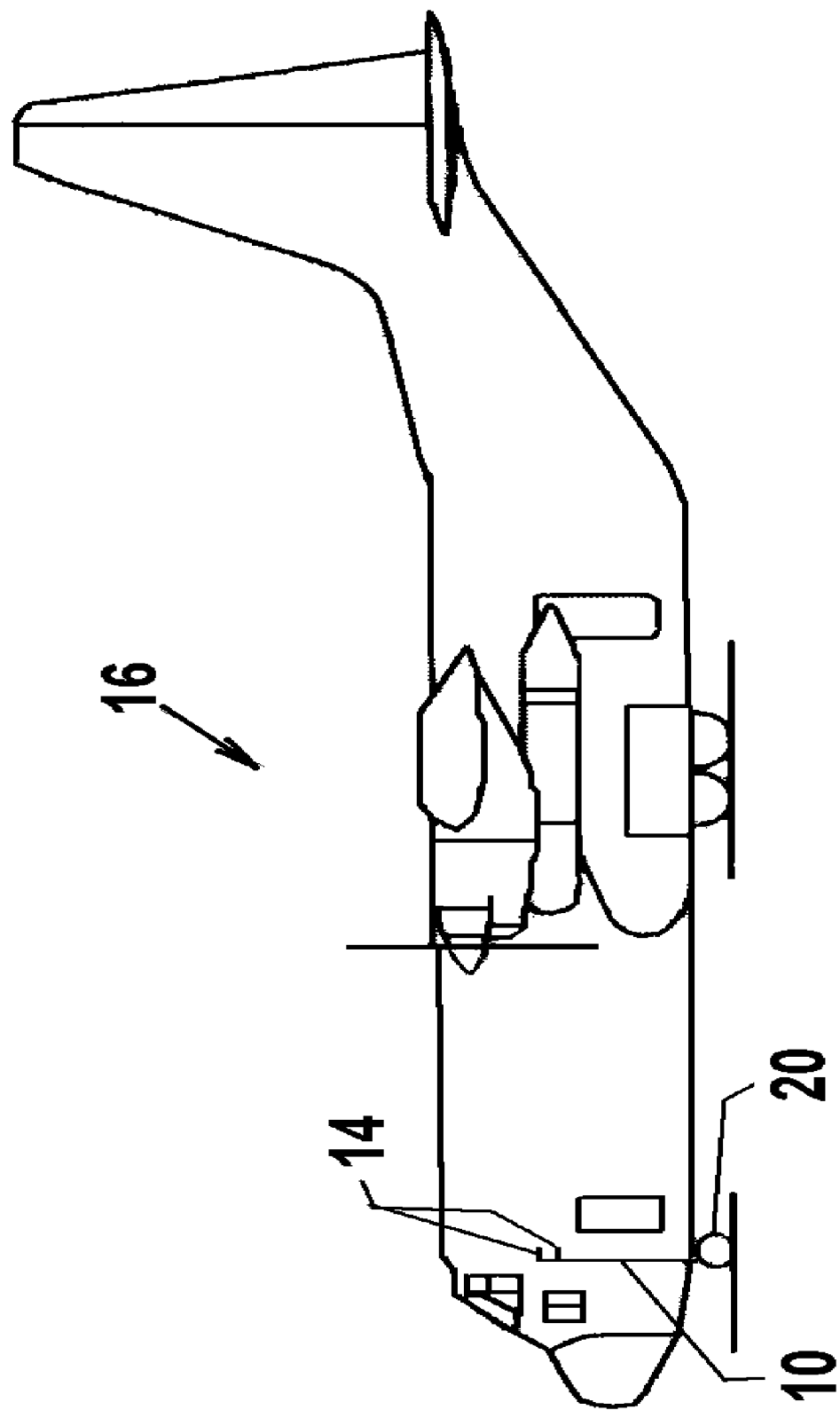
FIG. 1 is side view of an aircraft provided with an aircraft ground maintenance tether assembly in accordance with an embodiment of the invention.
Figure 2:
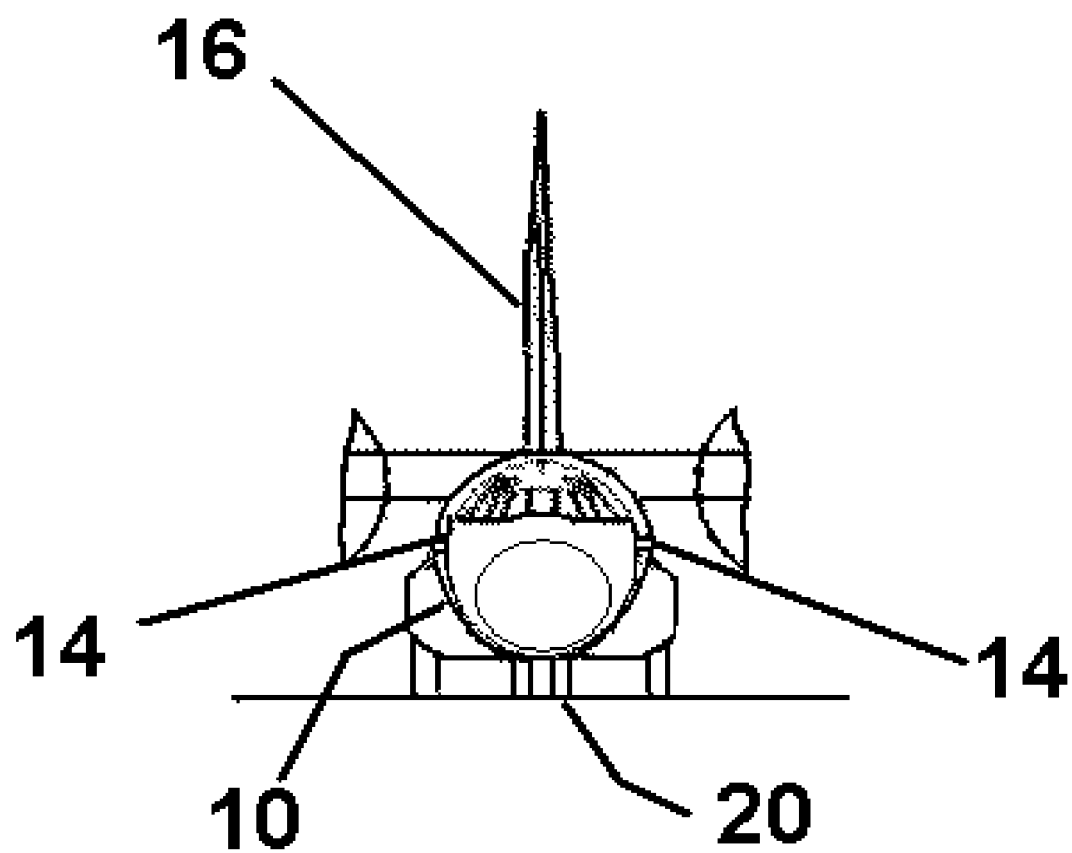
FIG. 2 is a front view of the aircraft of FIG. 1

Referring to drawings, FIGS. 1 and 2 show an aircraft ground maintenance tether assembly 10 for assuring the installation and removal of covers for the pitot tubes 14 of an aircraft 16 during ground stays for maintenance, layovers and other normal extended aircraft ground based activities. The tether assembly 10 has particular benefit for the Hercules C130 aircraft. Therein, the aircraft 16 is provided with a pair of vertically spaced pitot tubes 14 on each side of the aircraft, generally vertically positioned above the front landing gear 20. As described below, the tether assembly 10 also includes a lock pin for conventional insertion into an aircraft dependent aperture in the front landing gear retraction assembly for disabling the retraction system therefor in order to avoid inadvertent collapse during ground operation. As part of the preflight check list, the pitot tube covers are removed and the lock pin is removed whereby retraction mechanism is again enabled.

Figure 3:
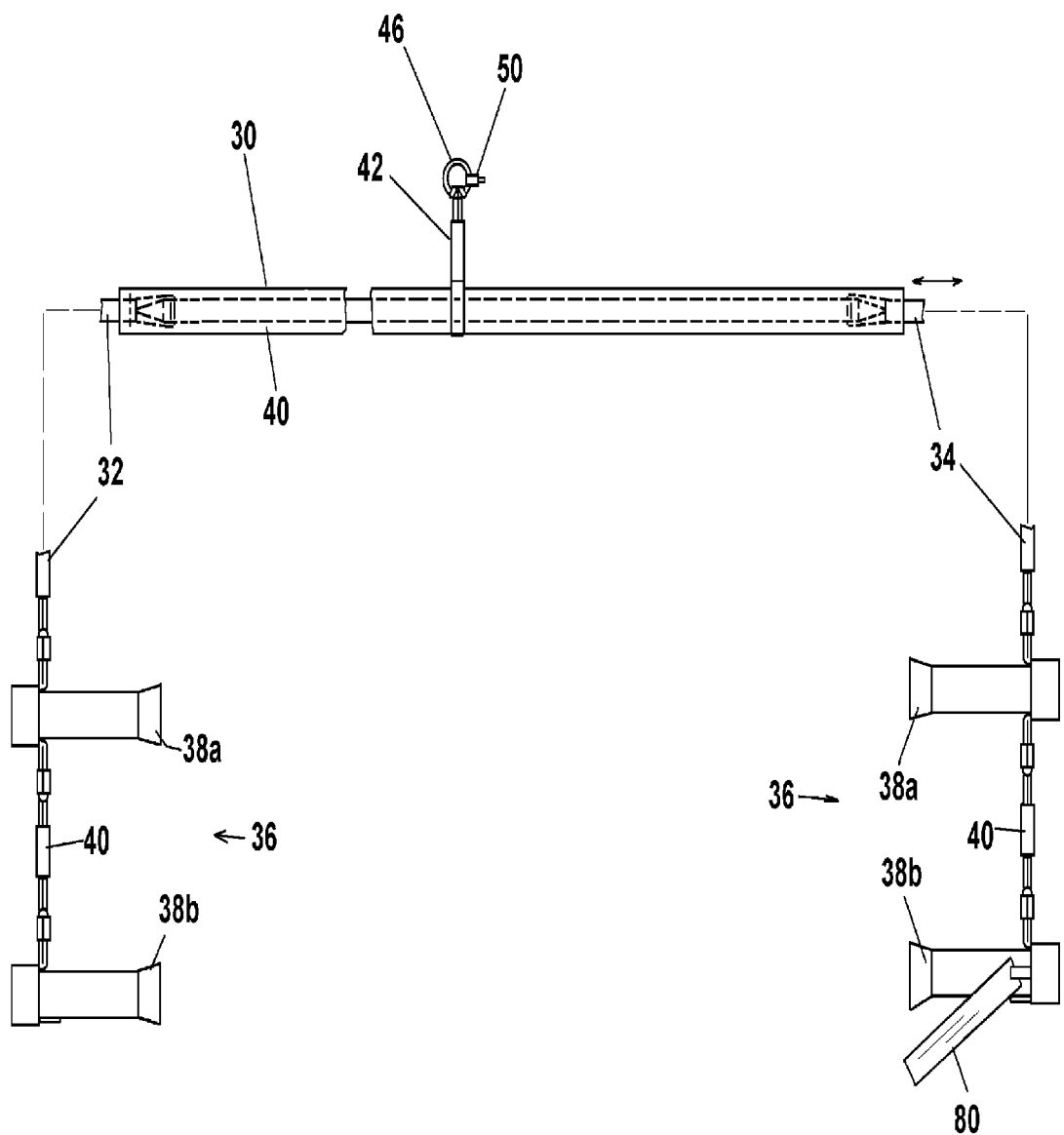
FIG. 3 is a top view of the tether assembly.
Figure 4:
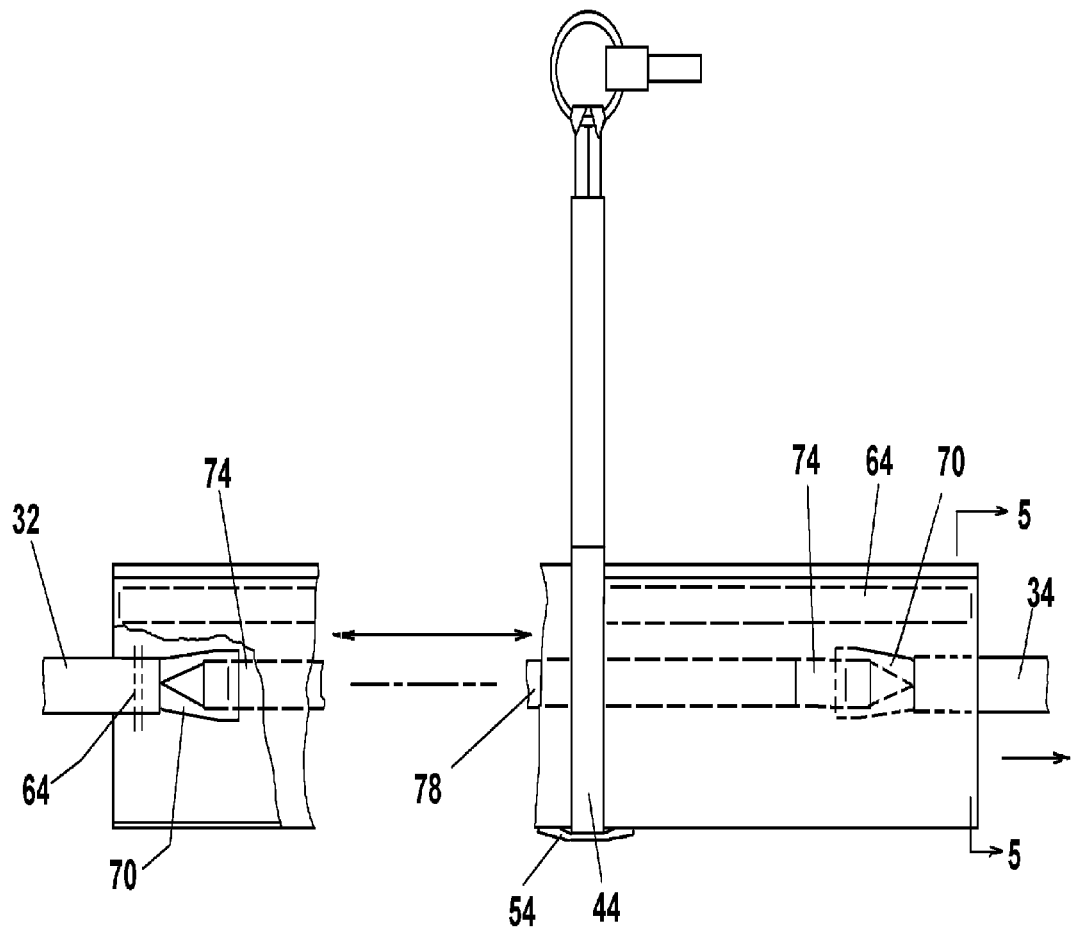
FIG. 4 is a top view of the sleeve assembly for the tether assembly.
Figure 5:
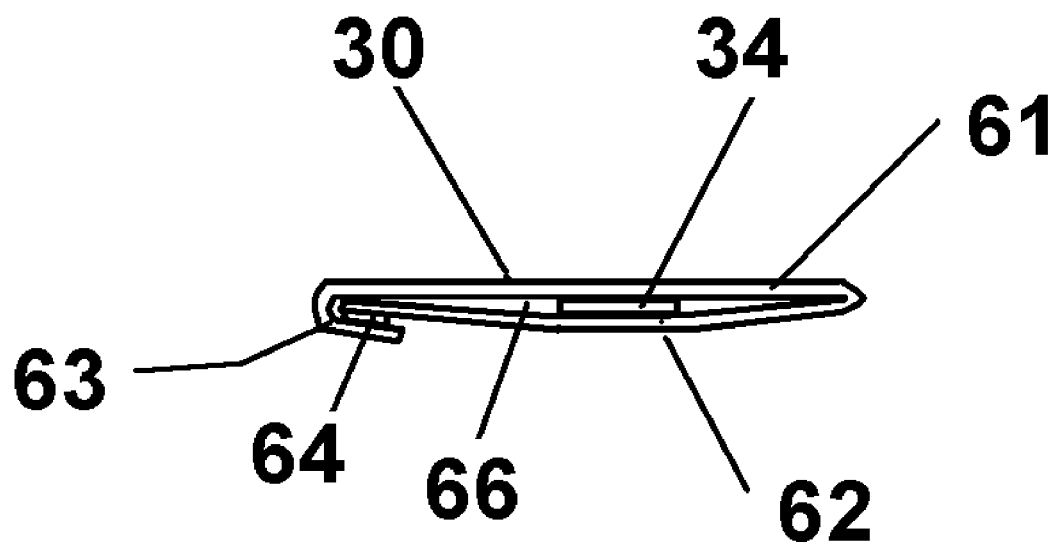
FIG. 5 is a view taken along line 5-5 of FIG. 4.

The tether assembly 10 of the present invention integrates a tethering system with both the pitot covers and the locking pin to assure removal of both items prior to flight. Referring to FIGS. 3 through 5, the tether assembly 10 includes an expandable sleeve assembly 30 having straps 32, 34 with proximal ends extending from opposite ends thereof and distal ends attached to a pitot tube cover assembly 36, each comprising a pair of pitot covers 38a and 38b interconnected by connecting strap 40. A lock pin strap 42 has an end loop 44 encircling the center section of the sleeve assembly 30 and terminates with a carrying ring 46 threaded through a cross hole in the head section 48 of a landing gear lock pin 50. The lock pin 50 includes a shank section 52 for coupling with the landing gear retraction system as described below to prevent inadvertent actuation of the retraction system during ground operations. A retaining strap 54 is connected to the cover assembly 32 and retains the strap 42 in assembly.

Referring to FIGS. 4 and 5, the sleeve assembly 30 comprises a rectangular body panel 60 having a base surface 61 connected to a reversely turned face surface 62. The base surface 61 has a reversely folder flap 63, The flap 63 and face surface 62 have a longitudinal fastening system 64, such as hook and loop strips, at the lateral sides thereof for forming a sleeve with a longitudinal passage 66 therethrough. Other systems such as zippers, button, snaps or the like can be used for the sleeve and to permit access to the interior for assembly and repair. The strap 32 is fixedly attached to the panel 62 by cross stitching 64. The strap 34 is attached to the panel 62 by an elastic cord assembly 66. The cord assembly 66 includes end loops 70 connected at outer ends to the straps 32, 34, respectively, and connected at inner ends to end loops 74 of an elastic cord 78. The entire cord assembly 66, particularly the elastic cord 78, is retained interior of the cover assembly 60 and thus shielded from environmentally degrading UV radiation. Normally, these cords are susceptible to environmental degradation during the long layover times the aircraft may experience, and consequently fail and require replacing. By retaining the cord entirely in the passage, the cord in isolated from sunlit conditions, extending the trouble free life thereof. The cord comprises an elastomeric core covered by an outer fabric sleeve. A bungee type cord is a preferred cord construction.

Accordingly, the length of the assembly may be elastically elongated in length in the direction of the arrows to provide tensioning of the tether assembly against the fuselage of the aircraft in assembly.

Each cover assembly 36 includes one or more pitot covers 38 connected to a distal end of the strap. For the present embodiment two covers are provided, a lower cover 38a and an upper cover 38b. Both covers are provided with diametrically opposed side loops 74. One loop of each lower cover 38a is connected to the distal ends of the straps 32, 34. An opposed loop of the lower cove is connected the connecting strap 40 connected to a comparable loop on the upper cover. Each cover may have an additional loop for mounting a highly visible removal banner 80 thereon carrying an appropriate indicia thereof such as "Remove Before Flight" reinforcing notice for removal prior to flight. Suitable covers are described in our prior patents, U.S. Pat. Nos. 6,412,343 and 6,901,793. Such covers are commercially available from Sesame Technologies Inc. of Belhaven N.C., exclusive licensee of the above patents. Preferably, the covers are formed of heat and abrasion resistant woven materials such as meta-ara id polymers. Suitable materials are available such as NOMEX™ or KEVLAR™ materials from E.I. DuPont deNemours and Company.

In the present embodiment, the pitot tubes are at an elevation that manual positioning of the covers on the pitot tubes is required.

The length of the connecting strap 40 is preferably slightly longer than the distance between the pitot tubes to avoid imposing any adverse loading thereon. The overall length of the tether assembly with respect to the first or lower pitot tube covers is slightly less than the distance from the associated pitot tubes about the fuselage, so as to result in an elastic biasing from the cord to retain the tether assembly snugly against the aircraft, notwithstanding ambient wind conditions, without imparting significant loading on the pitot tubes. The connecting strap 42 and the lock pin 50 have a length al owing insertion of the lock pin without strap tensioning, but short enough so as not to become entangled with any neighboring components.

Figure 6:
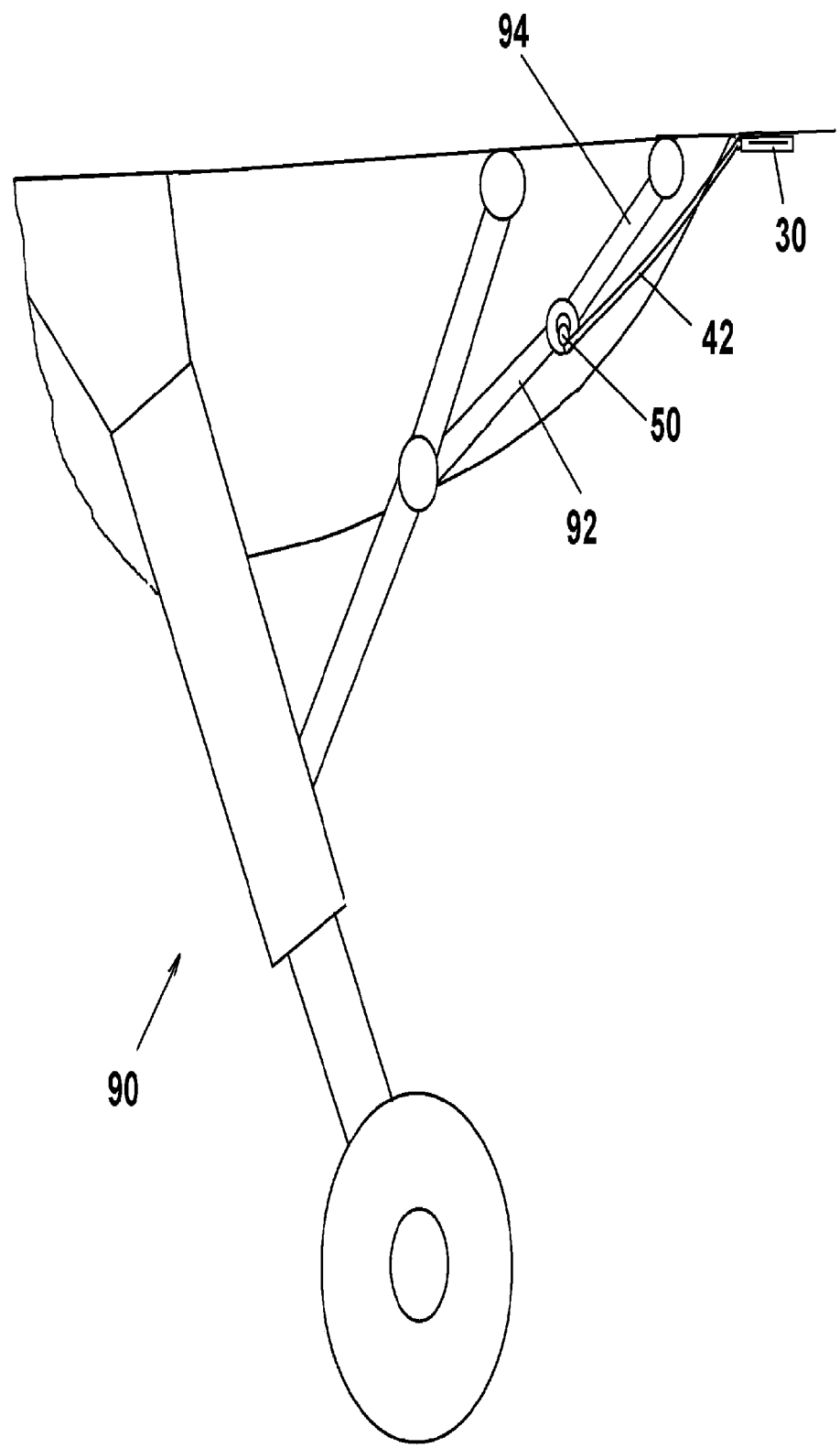
FIG. 6 is a schematic view of a landing gear assembly disabled by the lock pin of the tether assembly.

The landing gear disabling takes various forms dependent on the aircraft, mechanically preventing actuation of a retraction linkage or by disabling a retraction actuator. In these designs, a lock pin is inserted into the appropriate aperture. By way of example and not limitation, referring to FIG. 6, the front landing gear retraction assembly 90 is provided with aligned through holes in the gear struts 92, 94. The shank 52 of the lock pin 50 is inserted into the holes and prevents articulation of the struts thereby disabling the retraction system and maintaining the lowered position of the gear.

For installation, the covers are installed alternately at the sides of the aircraft thereby tensioning the cover assembly to provide the biasing of the tether assembly against the fuselage. Thereafter the lock pin in installed. Removal is by reverse sequence. By coupling the landing gear locking pin and covers in a single assembly with highly visible banners and covers. The identification of one component is an indication that preflight removal has not been completed. Thereafter, undertaking the removal of one component is physically coupled to adjacent components thus compelling the ground personnel to remove all items in order to stow the assembly prior to flight. Also, the woven fabric construction of the major components of the tether assembly lends to compact storage on the aircraft thus providing an assured deployable maintenance assembly at the next required layover.

In the embodiment shown in FIGS. 7-10, the tether assembly 110 is adapted for manual installation of the pitot tube covers on pitot probes that are positioned at an elevation above manual access. Therein, a pitot cover pole assembly 112 allows manual positioning and installing of the covers at the higher elevation, while providing integration in a tether assembly for unitized deployment and storage, or without the tether, and allowing singular disposition, transport, and/or storage. In the latter condition, the end of the cover assembly is provided with a connecting member for attaching to an aircraft surface to restrict movement during deployment.

Figure 7:
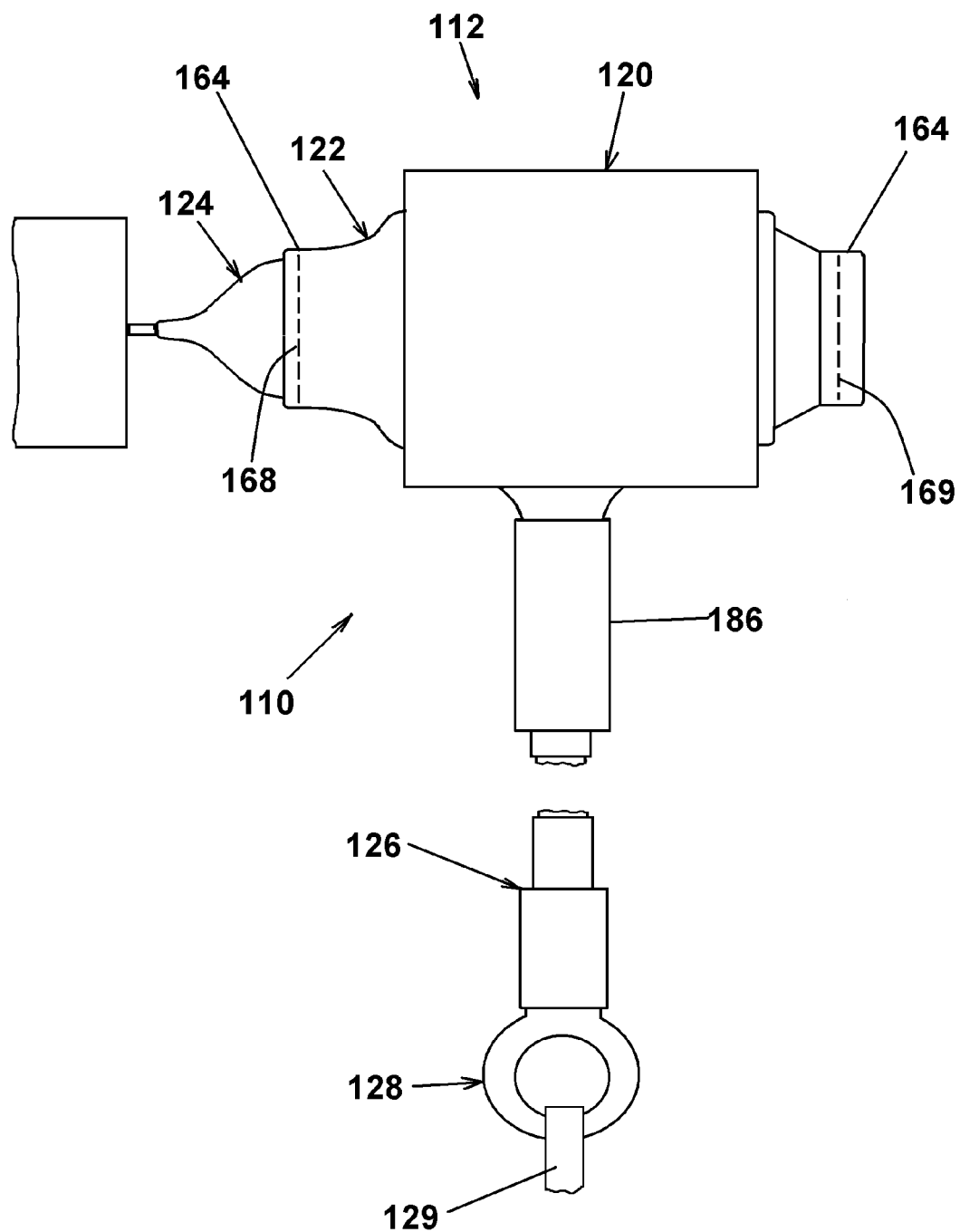
FIG. 7 is a side view of a pitot cover pole assembly for a tether assembly in accordance with another embodiment of the invention.
Figure 8:
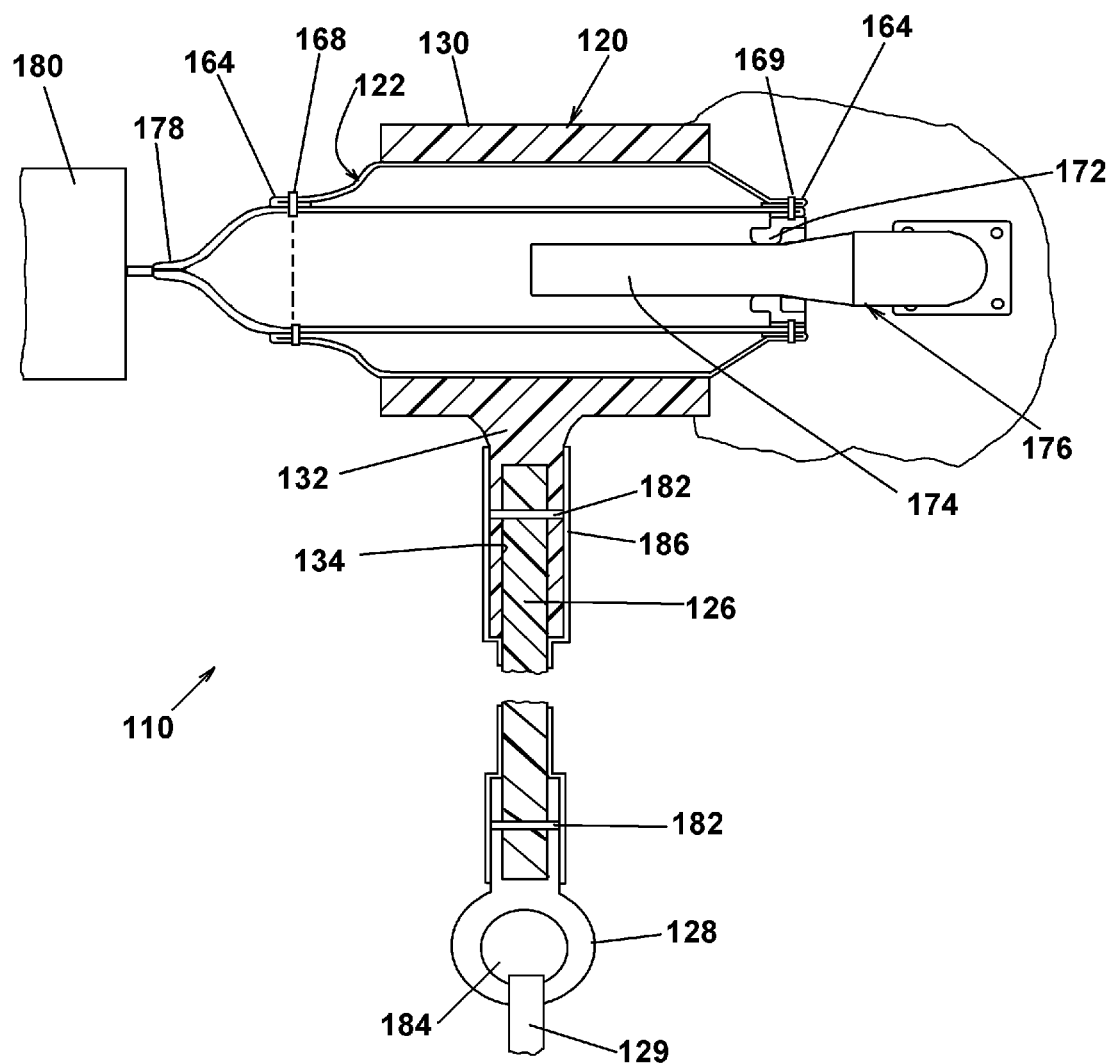
FIG. 8 is a side cross sectional view of the pitot cover pole assembly of FIG. 7 installed over the pitot tube of an aircraft.

Referring to FIGS. 7 and 8, the cover pole assembly 112 comprises an elastomeric heat resistant support sleeve 120 carrying a heat resistant woven support tube 122 holding a pitot cover 124, a rigid support post 126 connected to the sleeve 120 and a connector arm 128 attached at the bottom end of the support post 126. The connector arm 128 is connected to one end of a tether assembly 129 as described above, the other end of the tether assembly 129 connected with a cover assembly for the pitot probe(s) on the other side of the aircraft.

The support sleeve 120 comprises an elastomeric cylindrical body 130 having a longitudinal bore therethrough. The body 130 includes an integral connecting arm 132 extending radially downward from the outer surface of the body 130. The arm 132 includes a downwardly opening recess 134 for receiving in assembly a terminal end of the support post 126.

Figure 9:
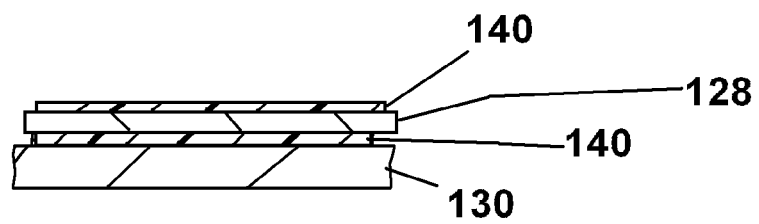
FIG. 9 is a fragmentary cross sectional view of pitot cover support sleeve.

The support tube 122 is a woven cylindrical sleeve of a heat resistant material such as Kevlar having a diameter about the same as the bore of the support body 130. The body 130 is a cured matrix of milled rubber and heat resistant fibers, preferably the same material as the sleeve. As such, the body does not bind adequately directly to the woven tube. Referring to FIG. 9, we have found that pretreating the woven tube 128 with a two part silicone rubber 140 will provide a tightly bonded interface with the body matrix.

Figure 10:
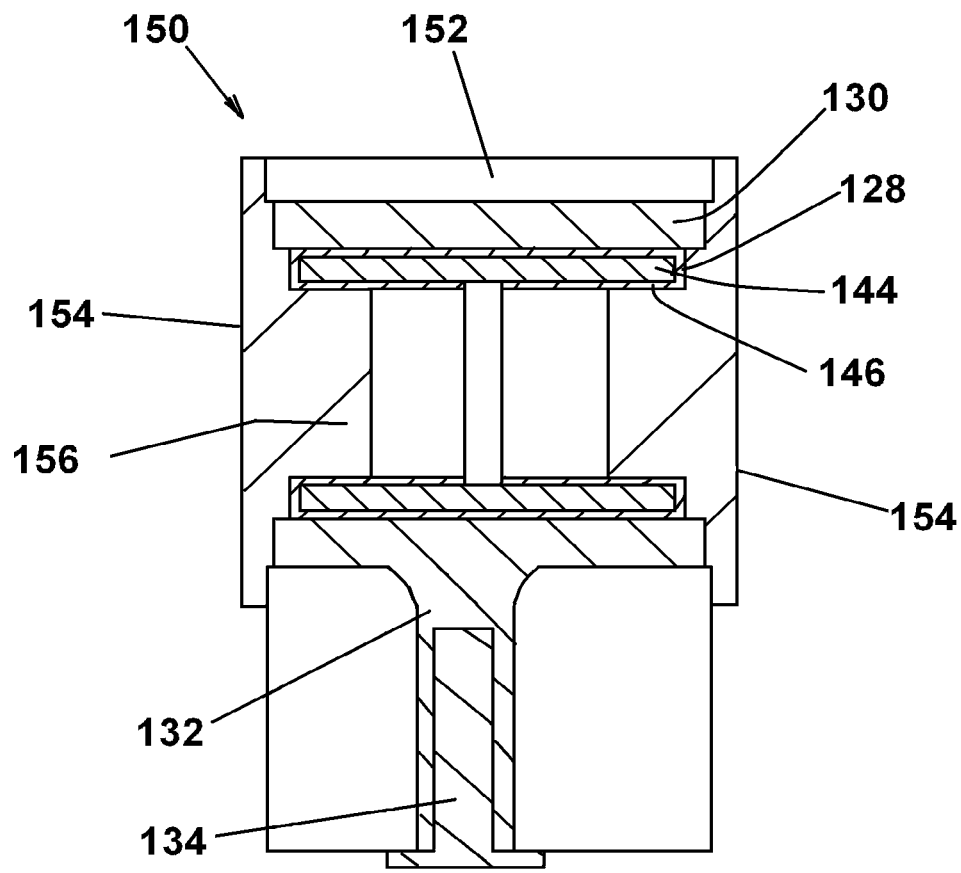
FIG. 10 is a cross sectional view of the pitot cover assembly in the manufacturing mold.

Referring additionally to FIG. 10, this is accomplished by placing the woven tube 128 over a cylindrical core mandrel 144 and applying a layer of the silicone rubber 140 about the tube and through the weave to establish to establish coating layers on the inner and outer surfaces of the tube. The ends of the tube are reversely tucked into the mandrel bore to form the tube mandrel assembly 148. A suitable silicone rubber is a two part silicone package from Wack Chemie AG comprising Part A as product no. 3009-28 and Part B as product no. 3009-20B.

As shown in FIG. 10, the tube/mandrel assembly 148 is mounted in a three piece mold 150 comprising a split two-piece center section 152 having interior surfaces corresponding to the outer surfaces of the support sleeve 120, and end caps 154 having inner hubs 156 supporting the tube/mandrel assembly 148 and providing the end surfaces of the sleeve. A side core 158 is provided for establishing the recess for the support post.

The mold halves of the center section are packed with the milled uncured rubber and fiber mixture and manually distributed to the desired contours for the support sleeve. A high temperature silicone rubber is sheet form is milled with loose, chopped fiber fines to form a matrix of about 1-2% fiber by weight. The fibers are preferably the heat resistant fibers used in the covers, such as Kevlar. A suitable uncured rubber is a 70 durometer rubber available as product no. 25787-V-Red from Silcotech North America, Inc. The matrix is processed into thin sheets for conformal insertion into the mold.

With the mandrel assembly and side core roughly positioned, the mold halves are assembled and clamped. The mold assembly is heated at a temperature and for a time sufficient to cure the matrix. Temperatures in the range of about 350° F. to 400° F. for a period of about 10 to 20 minutes have provided satisfactory results.

After curing, the part is disassembled from the mold components, the ends of the sleeve removed from the mandrel, and the mandrel removed. The sleeve ends are inwardly folded as shown in FIG. 8 to form outer annuli 164 with aligned openings. A pitot cover 124 is then inserted into the annuli, which are circumferentially attached thereto by stitchings 168, 169. The pitot cover 124 is of the type disclosed in U.S. Pat. No. 6,901,793. Other suitable covers are commercially available from Sesame Technologies, Inc. The cover 124 on the forward end 170 includes an annular sealing element 172 that is telescopically inserted over the frontal end 174 of the pitot probe 176 is inserted. The rearward end 178 of the cover is folded and stitched for form a closure. A banner 180 containing conventional indicia such as "Remove Before Flight" is attached to the rearward end 178.

The sup port post 126 is formed of a relatively rigid but limitedly flexible heat resistant material such a fiberglass. The ends of the post 126 are inserted into recesses in the support body and the connector arm 128 and attached thereat by a suitable adhesive. The connector arm 128 is preferably molded from the said material as the support collar to provide a flexible, durable and soft material to avoid any impact or abrasion damage to the fuselage during deployment. For additional resistance to separation, the post ends may be connected to the associated part by cross members 182, such a rigid pin, or by flexible lashing. The connector arm 128 includes an end aperture 184 for connection with the tether 129 or mechanical attachment to the aircraft. The arms and support post may be clad by heat shrink tubing 184 to provide exterior protection and to unitize the assembly of the support post assembly.

For aircraft installation, the cover assemblies may be attached to a tethering assembly as described above, before or after installation over the pitot probes. If after installation, it is preferred to incorporate a decoupling component such as clip at both ends to facilitate interconnection and separation. While extended lengths of support post may be used, it is generally preferred to limit the length to about 1-2 feet, depending on the aircraft being serviced. For instance, a 12 inch post has been demonstrated as sufficient for the expected range of personnel on military aircraft such as, without limitation, the C130H, commercial aircraft such as the Boeing 737, and business aircraft such as Challenger and Gulfstream planes. Higher elevation probes are preferably handled by specialized installation tools such as the installer described in out pending application, U.S. Ser. No. 12/580,234 filed on Oct. 15, 2009 and entitled "PITOT TUBE COVER INSTALLATION TOOL".

Having thus described a presently preferred embodiment of the present invention, it will now be appreciated that the objects of the invention have been fully achieved, and it will be understood by those skilled in the art that many changes in construction and widely differing embodiments and applications of the invention will suggest themselves without departing from the sprit and scope of the present invention. The disclosures and description herein are intended to be illustrative and are not in any sense limiting of the invention, which is defined solely in accordance with the following claims.

What is claimed:

1. A ground maintenance assembly for an aircraft having at least a pitot tube located on opposed sides of a fuselage at an elevation above manual access and a front landing gear having a retracting linkage immobilized by insertion of a locking pin into a locking aperture thereon, said maintenance assembly comprising:
   a pair of pitot cover pole assemblies, each comprising
      a pitot tube cover for telescopic insertion over each pitot tube;
      an elastomeric body comprised of a matrix of fused milled rubber and heat resistant fiber, said body having a longitudinal bore;
      a tubular member of heat resistant woven material bonded to an inwardly facing surface of said bore with a silicone adhesive, said tubular member telescopically receiving said cover and being connected thereto;
      an elongated member having one end connected to said elastomeric body and a connecting member at another end;
   an expandable tether assembly having opposed elongated straps, each having a distal end connected to one of said connecting members of a pole assembly.

2. A pitot tube cover assembly for covering the pitot tube of an aircraft wherein said pitot tube is located at an elevation beyond manual access, comprising:
   a pitot tube cover formed of a heat resistant woven material and having an open ended cavity for telescopically receiving the pitot tube;
   a cylindrical elastomeric support collar consisting of a matrix of cured rubber and heat resistant fiber, said collar having an axial bore therethrough
   a tubular sleeve of heat resistant woven material telescopically received in said bore and bonded to said support sleeve;
   an elongated shaft having first end connected to said support collar whereby said shaft may be manually directed for telescopically inserting said pitot cover over the pitot tube.

3. The pitot tube cover assembly as recited in claim 2 wherein said support collar has a tubular arm radially extending from an out surface thereof and having an outwardly opening recess for receiving said first end of said shaft.

4. The pitot tube cover assembly as recited in claim 3 wherein a connecting member is connected with a second end of said shaft, said connecting member including a restraining device for holding the shaft in operative position on the aircraft.

5. The pitot tube cover assembly as recited in claim 2 wherein said matrix of said support collar contains at least 1% of said fiber by weight.

6. The pitot tube cover assembly as recited in claim 2 wherein said collar is bonded to said support sleeve with a two part silicone rubber adhesive.

7. The pitot tube cover assembly as recited in claim 3 wherein said connecting member, said shaft and said arm are clad with an exterior sheath of heat shrink material for unitizing the assembly thereof.

* * * * *